US012686005B2

(12) United States Patent
Dudukovic et al.

(10) Patent No.: US 12,686,005 B2
(45) Date of Patent: *Jul. 21, 2026

(54) SYSTEMS AND METHODS FOR REACTION AND TRANSPORT ENGINEERING VIA CELLULAR FLUIDICS

(71) Applicant: Lawrence Livermore National Security, LLC, Livermore, CA (US)

(72) Inventors: Nikola Dudukovic, Hayward, CA (US); Sarah Baker, Dublin, CA (US); Victor Alfred Beck, Livermore, CA (US); Swetha Chandrasekaran, Dublin, CA (US); Joshua R. Deotte, Livermore, CA (US); Eric B. Duoss, Danville, CA (US); Jeremy Taylor Feaster, Fremont, CA (US); Jennifer Marie Knipe, Oakland, CA (US); Julie Mancini, Livermore, CA (US); James Oakdale, Castro Valley, CA (US); Fang Qian, Santa Cruz, CA (US); Marcus A. Worsley, Hayward, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 287 days.

This patent is subject to a terminal disclaimer.

(21) Appl. No.: 16/549,543

(22) Filed: Aug. 23, 2019

(65) Prior Publication Data

US 2021/0053056 A1 Feb. 25, 2021

(51) Int. Cl.
*B01L 3/00* (2006.01)
*B29C 64/129* (2017.01)

(52) U.S. Cl.
CPC ...... B01L 3/502707 (2013.01); B29C 64/129 (2017.08); B01L 2200/0678 (2013.01);
(Continued)

(58) Field of Classification Search
CPC ......... B01L 3/502707; B01L 2400/088; B01L 2400/086; B01L 2300/0893;
(Continued)

(56) References Cited

U.S. PATENT DOCUMENTS 5,545,280 A 8/1996 Wenz
6,146,892 A 11/2000 Ma et al.
(Continued)

FOREIGN PATENT DOCUMENTS

CN 107261996 A 10/2017
WO WO-2017142867 A1 * 8/2017 ............. B33Y 70/00
WO WO-2018022035 A1 * 2/2018 ........... B29C 64/386

OTHER PUBLICATIONS

Definition of "fluid" from Merriam-Webster Dictionary, retrieved from https://web.archive.org/web/20140213150024/https://www.merriam-webster.com/dictionary/fluid (Year: 2014).*
(Continued)

*Primary Examiner* — Melvin C. Mayes
*Assistant Examiner* — Sophia Y Lyle
(74) *Attorney, Agent, or Firm* — HARNESS, DICKEY & PIERCE P.L.C.

(57) ABSTRACT

The present disclosure relates to a computer aided design (CAD) manufactured lattice structure. The structure may have a plurality of tessellated cells formed from a plurality of interconnected struts, with the interconnected struts formed from a curable resin. The interconnecting struts form voids within each cell, with the voids communicating with one another. The struts may be formed such that the voids have a non-uniform dimension to create a varying porosity within the lattice structure.

13 Claims, 6 Drawing Sheets

(52) U.S. Cl.
CPC .................. *B01L 2300/0877* (2013.01); *B01L 2300/0893* (2013.01); *B01L 2300/12* (2013.01); *B01L 2300/1805* (2013.01); *B01L 2400/0406* (2013.01); *B01L 2400/086* (2013.01); *B01L 2400/088* (2013.01); *Y10T 428/249953* (2015.04)

(58) Field of Classification Search
CPC ..... B01L 2300/0877; B01L 2200/0678; B01L 2300/12; B01L 2300/1805; B01L 2400/0406; B01L 2300/0874; B01L 2300/0864; B29C 64/129; B29C 64/135; Y10T 428/249953; B81C 1/00119; B81B 2201/051; B81B 2201/058; B33Y 10/00; B33Y 80/00
See application file for complete search history.

(56) References Cited

U.S. PATENT DOCUMENTS

| | | | |
|---|---|---|---|
| 6,645,432 B1 | 11/2003 | Anderson et al. | |
| 6,673,285 B2 | 1/2004 | Ma | |
| 7,503,833 B2 | 3/2009 | Muldowney | |
| 7,517,277 B2 | 4/2009 | Muldowney | |
| 7,527,671 B1 | 5/2009 | Stuecker et al. | |
| 7,604,529 B2 | 10/2009 | Muldowney | |
| 7,635,291 B2 | 12/2009 | Muldowney | |
| 8,721,959 B2 | 5/2014 | Dry | |
| 8,920,879 B2 | 12/2014 | Toohey et al. | |
| 9,597,837 B1* | 3/2017 | Cesarano, III | C04B 35/00 |
| 2004/0226620 A1 | 11/2004 | Therriault et al. | |
| 2006/0091051 A1 | 5/2006 | Takada et al. | |
| 2006/0235105 A1 | 10/2006 | Gratson et al. | |
| 2008/0176272 A1* | 7/2008 | Bergman | B01L 3/502761 |
| | | | 435/283.1 |
| 2013/0056912 A1 | 3/2013 | O'Neill et al. | |
| 2013/0143060 A1 | 6/2013 | Jacobsen et al. | |
| 2013/0264749 A1* | 10/2013 | Jones | G06F 30/00 |
| | | | 264/497 |
| 2013/0273347 A1* | 10/2013 | Jacobsen | B32B 3/12 |
| | | | 428/304.4 |
| 2016/0139102 A1* | 5/2016 | Mccord | B01L 3/5023 |
| | | | 435/287.7 |
| 2016/0151982 A1* | 6/2016 | Sand | B33Y 80/00 |
| | | | 428/201 |
| 2016/0282338 A1 | 9/2016 | Miklas et al. | |
| 2017/0151584 A1 | 6/2017 | Wiesner et al. | |
| 2017/0351175 A1* | 12/2017 | Hansson | G03F 7/00 |
| 2019/0145298 A1* | 5/2019 | Abu Al-Rub | B01D 53/34 |
| | | | 55/523 |
| 2019/0152139 A1* | 5/2019 | Ulichney | B29C 64/171 |
| 2020/0276783 A1* | 9/2020 | Berger | E04C 3/28 |
| 2021/0077999 A1 | 3/2021 | Dudukovic et al. | |

OTHER PUBLICATIONS

International Search Report and Written Opinion regarding International Application No. PCT/US2020/047424, dated Dec. 2, 2020.
J. Berthier, K. A. Brakke, and E. Berthier, "A general condition for spontaneous capillary flow in uniform cross-section microchannels," Microfluid Nanofluid, vol. 16, No. 4, pp. 779-785, Apr. 2014, doi: 10.1007/s10404-013-1270-1.
R. S. Hale, R. Ranjan, and C. H. Hidrovo, "Capillary flow through rectangular micropillar arrays," International Journal of Heat and Mass Transfer, vol. 75, pp. 710-717, Aug. 2014, doi: 10.1016/j.ijheatmasstransfer.2014.04.016.
S. Das, H. V. Patel, E. Milacic, N. G. Deen, and J. a. M. Kuipers, "Droplet spreading and capillary imbibition in a porous medium: A coupled IB-VOF method based numerical study," Physics of Fluids, vol. 30, No. 1, p. 012112, Jan. 2018, doi: 10.1063/1.5010716.
J. Cai, E. Perfect, C.-L. Cheng, and X. Hu, "Generalized Modeling of Spontaneous Imbibition Based on Hagen-Poiseuille Flow in Tortuous Capillaries with Variably Shaped Apertures," Langmuir, vol. 30, No. 18, pp. 5142-5151, May 2014, doi: 10.1021/la5007204.
T. Gambaryan-Roisman, "Liquids on porous layers: wetting, imbibition and transport processes," Current Opinion in Colloid & Interface Science, vol. 19, No. 4, pp. 320-335, Aug. 2014, doi: 10.1016/j.cocis.2014.09.001.
P. Randive, A. Dalal, and P. P. Mukherjee, "Mesoscopic Modeling of Capillarity-Induced Two-Phase Transport in a Microfluidic Porous Structure," Transp Porous Med, vol. 122, No. 3, pp. 673-691, Apr. 2018, doi: 10.1007/s11242-018-1020-7.
J. Berthier et al., "On the halt of spontaneous capillary flows in diverging open channels," Medical Engineering & Physics, vol. 48, pp. 75-80, Oct. 2017, doi: 10.1016/j.medengphy.2017.05.005.
M. Prakash, D. Quere, and J. W. M. Bush, "Surface Tension Transport of Prey by Feeding Shorebirds: The Capillary Ratchet," Science, vol. 320, No. 5878, pp. 931-934, May 2008, doi: 10.1126/science.1156023.
M. Liu, S. Suo, J. Wu, Y. Gan, D. Ah Hanaor, and C. Q. Chen, "Tailoring porous media for controllable capillary flow," Journal of Colloid and Interface Science, vol. 539, pp. 379-387, Mar. 2019, doi: 10.1016/j.jcis.2018.12.068.
International Search Report and Written Opinion regarding International Patent Application No. PCT/US2021/059151, dated Mar. 4, 2022.
Dudukovic, Nikola A. et al., Cellular fluidics, Nature, 2021, vol. 595, pp. 58-65 and additional information pp. 1-13 (Online publication date: Jun. 30, 2021) pp. 58-65.
U.S. Appl. No. 17/097,480, filed Nov. 13, 2020, Nikola Dudukovic.

* cited by examiner

3D Spiral
Pyramid Climb
Path Design:

200

202

Fabricated Lattice, Filled - Top View:

200

202

SYSTEMS AND METHODS FOR REACTION AND TRANSPORT ENGINEERING VIA CELLULAR FLUIDICS

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates generally to microfluidics, and more particularly to systems and methods for facilitating open cell lattices for engineering transport phenomena and chemical reactions, which provide desired flow properties.

BACKGROUND

The statements in this section merely provide background information related to the present disclosure and may not constitute prior art.

A growing area of importance in the field of microfluidics involves is obtaining even greater levels of control over chemical reactions at interfaces with a structure, as well as obtaining even greater control over heat and mass transport at interfaces within a structure. Obtaining greater levels of control at interfaces may be important for chemical reactions, as well as heat and mass transport, in various types of devices such as electrochemical devices, thermochemical devices, bio-reactor devices, batteries, fuel cells, etc., which often involve the application of micro-fluidics. Conventional microfluidics are typically limited to actively-pumped fluid transport in enclosed microchannels, and typically are limited to structures having in a planar configuration. More advanced microfluidic structures which enable degrees of control over chemical reactions, as well as heat and mass transfer, at interfaces within the structure, would potentially open up new possibilities in chemical/process engineering applications.

SUMMARY

This section provides a general summary of the disclosure, and is not a comprehensive disclosure of its full scope or all of its features.

In one aspect the present disclosure relates to a computer aided design (CAD) manufactured lattice structure. The structure may comprise a plurality of tessellated cells formed from a plurality of interconnected struts, with the interconnected struts formed from a curable resin. The interconnecting struts form voids within each cell. The voids communicate with one another, and the struts are formed such that the voids have a non-uniform dimension to create a varying porosity within the lattice structure.

In another aspect the present disclosure relates to a computer aided design (CAD) manufactured lattice structure. The structure may comprise a plurality of tessellated cells formed from a plurality of interconnected struts, with the interconnected struts formed from a curable resin. The interconnecting struts form voids within each cell, with the struts being formed such that the voids have a non-uniform dimension and communicate with one another to create a varying porosity within the lattice structure. The lattice structure is constructed using a material which forms a catalyst to create solid-liquid-gas interfaces at each of the voids within the lattice structure.

In still another aspect the present disclosure relates to a method for forming an engineered lattice structure. The method may comprise using a substrate material to form a plurality of tessellated cells, the cells being defined in part by a plurality of interconnected struts. The method may further include forming the plurality of tessellated cells such that the interconnected struts define a plurality of voids in the plurality of tessellated cells, with the voids being in flow communication with one another. The method may further include forming the plurality of tessellated cells such that at least a subplurality of the voids have different dimensions, to create a varying porosity within the lattice structure.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present disclosure relates broadly to the design, fabrication and use of open cell lattices for facilitating engineering transport phenomena and chemical reactions. The architecture of the structures constructed using the teachings presented herein are "engineered" in the sense that the lattice structures are constructed in a highly defined manner in accordance with a CAD construction, and typically with a curable resin, to optimize important performance characteristics. Such performance characteristics may include control over porosity of the structure and capillary forces to provide desired flow properties including one or more desired capillary flow channels, as well as control over multi-phase interfaces and other functionalities that are important with microfluidic structures or devices.

The lattices of the present disclosure can be produced by additive manufacturing methods, for example and without limitation, via projection microstereolithography or two photon lithography. The use of additive manufacturing techniques to form the lattice structures of the various embodiments disclosed herein may be combined with other fabrication and processing techniques including, without limitation, fabrication techniques relating to surface functionalization, catalyst deposition, thermal treatment, removal of sacrificial material, etc. The foregoing manufacturing techniques may be used singly or in combination to achieve desired functionalities. Such desired functionalities may include one of, or combinations of, for example, a desired electric conductivity, a desired thermal conductivity, desired mechanical properties, a desired catalytic activity, or a desired stability, just to name a few important functionalities. By using lattice fluidics, a fluid can be distributed either passively (by capillary action alone) or actively (e.g., by pumping) in an open, three-dimensional configuration. These features offer significant potential for generating new microfluidic devices and related technologies in the field of chemical/process engineering and related devices (e.g., chemical/electrochemical reactors, packed beds, bubble columns, etc.).

Figure 1:
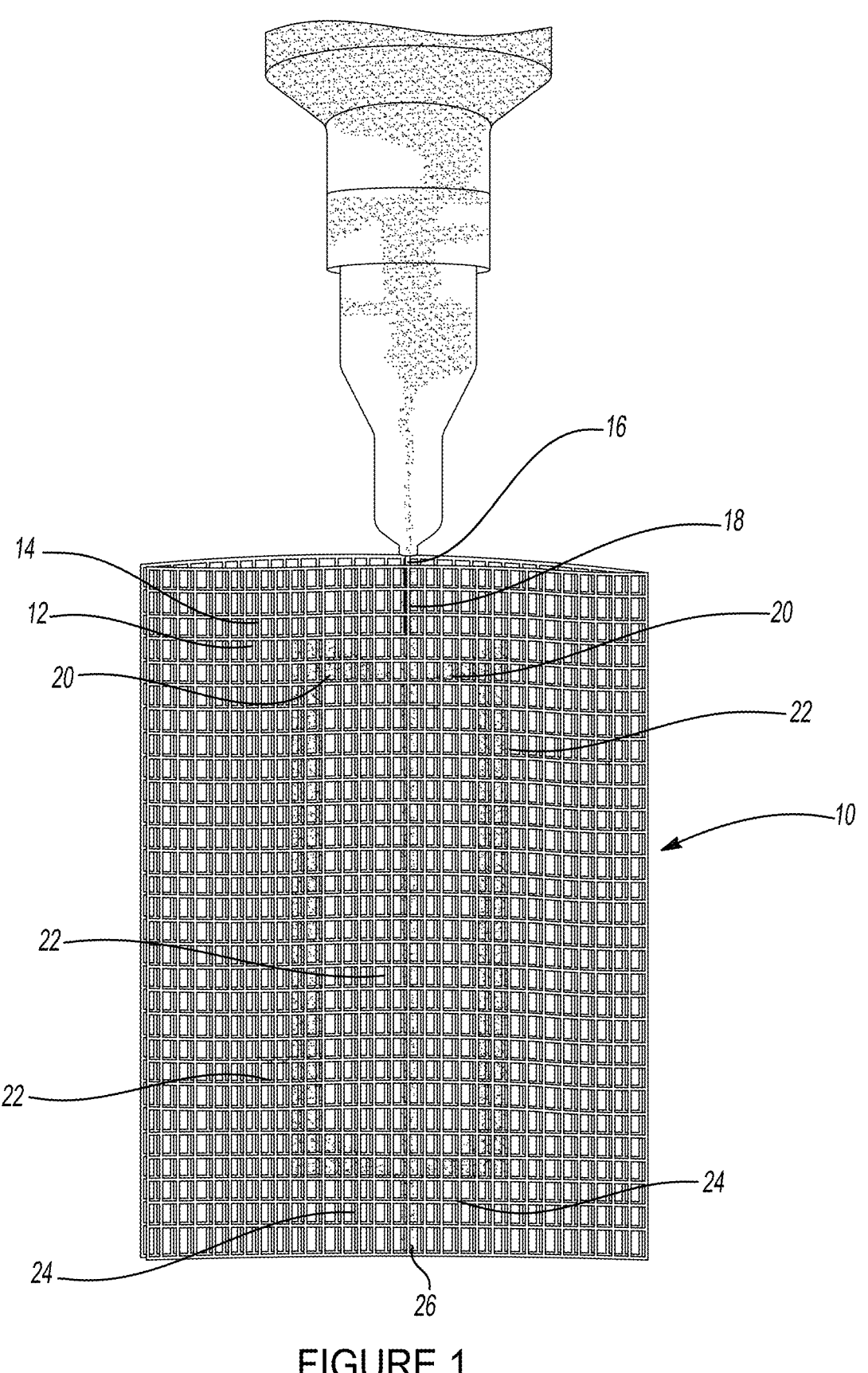
FIG. 1 is a perspective view of a single plane splitter lattice structure in accordance with one embodiment of the present disclosure.

FIG. 1 shows a lattice structure 10 in accordance with one embodiment of the present disclosure. The lattice structure 10 in this example forms a single plane channel splitter which is able to split a fluid flow into several desired paths within a single plane. The lattice structure 10 includes flow defining paths 12 and voids 14 having dimensions which, in this example, are engineered to provide the multi-flow path split seen occurring in the lattice structure 10. The fluid flow is injected or released at one end 16 of the lattice structure 10 and flows through capillary action along path 18 until branching into flows 20, which then propagate in three parallel paths 22 through a length of the lattice structure 10 before being channeled in flows 24 toward a center of the structure, and then re-combined into a single flow channel 26. Accordingly, the various flow channels are all presented within a single plane in this example. The dimensions of the fluid defining paths 12 and the voids 14 are controlled to provide the capillary action that creates these flow paths. While three parallel flow paths 22 are shown, together with one re-combined flow channel 26, it will be appreciated that a greater or lesser number of the flow paths 22 could be created, along with more than one re-combined flow channel 26.

Figures 2, 3, 4:
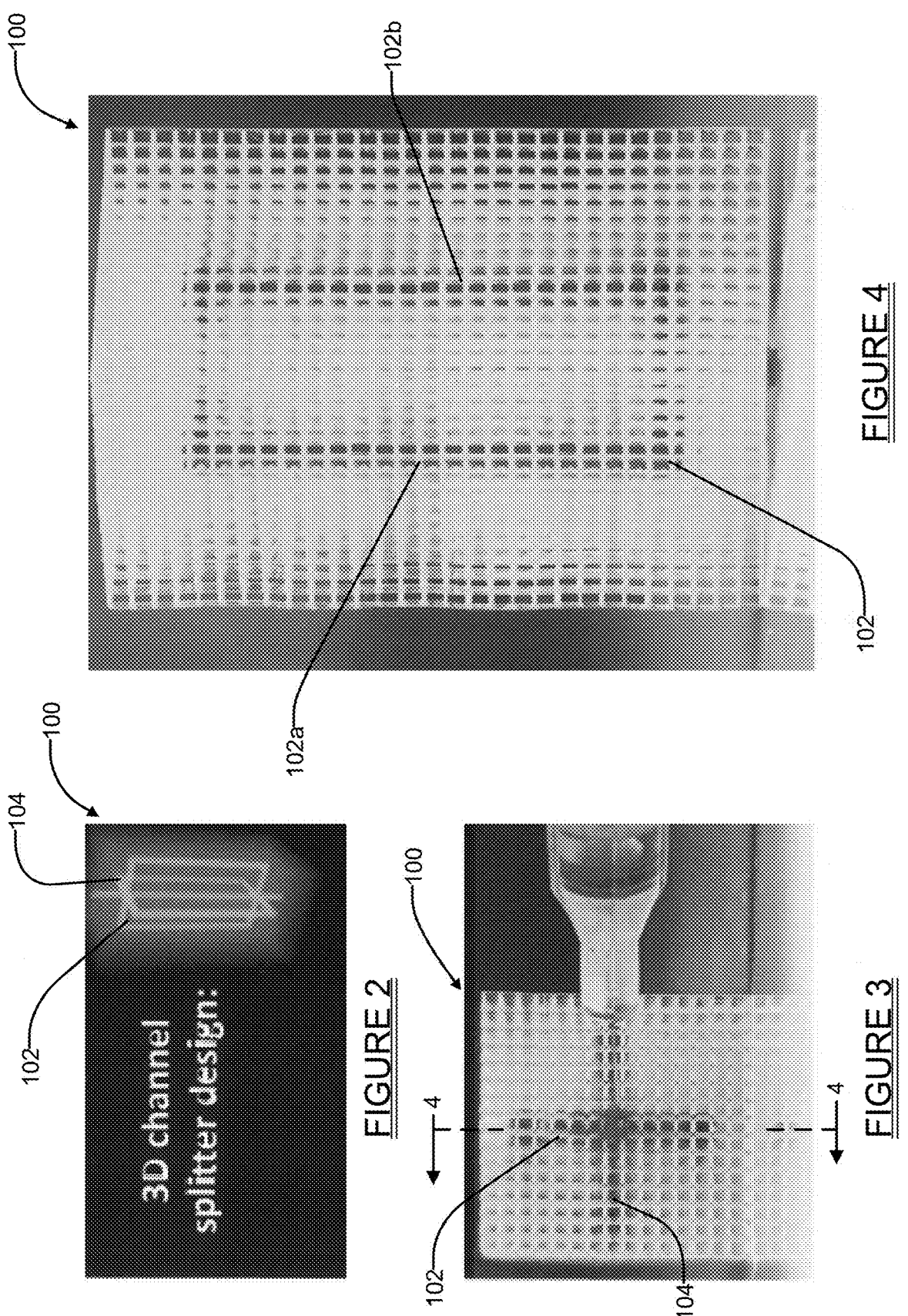
FIG. 2 is a simplified diagrammatic representation of a 3D channel splitter lattice structure.
FIG. 3 is a an illustration of a plan (top) view of the 3D structure shown in FIG. 2, with fluid flowing through capillary action in two orthogonal planes into the lattice structure.
FIG. 4 is a side view of the lattice structure in FIG. 3 taken in accordance with section line 4-4 in FIG. 3 further illustrating the splitting of the capillary flow through the lattice structure.

FIG. 2 shows a diagrammatic perspective view of a 3D lattice splitter structure 100 design where the fluid flow through the splitter structure occurs in two distinct planes 102 and 104 arranged orthogonal to one another (i.e., in a 3D space). FIG. 3 shows the 3D lattice splitter structure 100 from a plan (top) view, illustrating the intersecting orthogonal flow planes 102 and 104. FIG. 4 shows a side view taken in accordance with section line 4-4 in FIG. 3 showing the plane 102. The plane 102 can be seen to be formed by two parallel paths 102a and 102b.

While the lattice splitter structure 100 is shown with only two orthogonally arranged flow planes 102 and 104, it will be appreciated that a 3D lattice structure with more than two orthogonal flow planes could just as easily be formed. For example, a lattice structure with three distinct non-perpendicular flow planes angularly arranged at 120 degrees from another (from a plan view perspective) could be provided.

Figure 5:
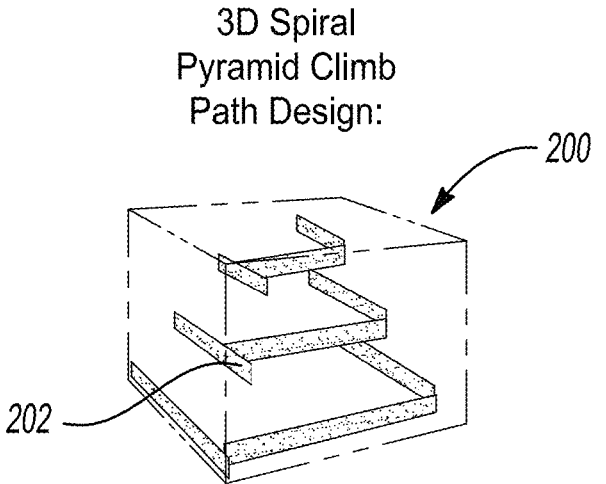
FIG. 5 is a perspective diagrammatic illustration of a 3D spiral flow pattern that may be created in a lattice structure using the teachings of the present disclosure.
Figure 6:
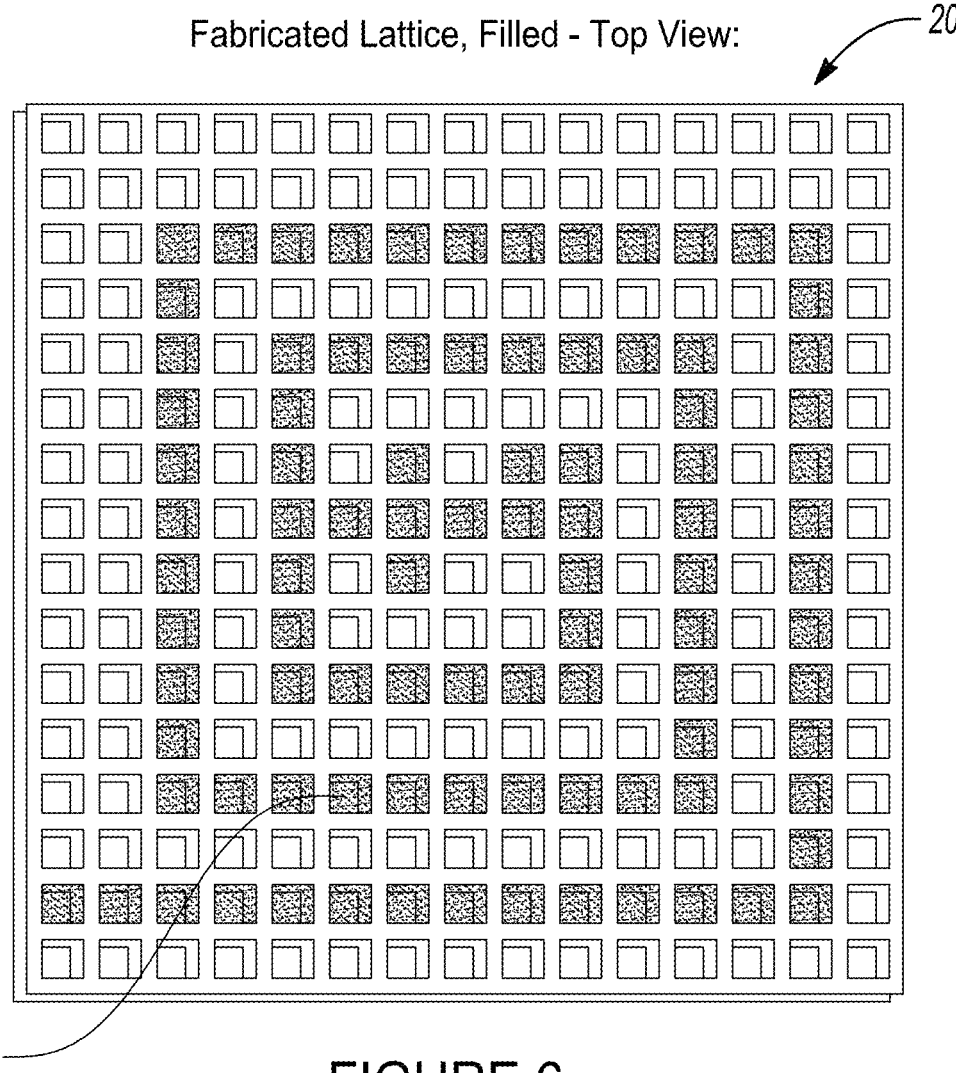
FIG. 6 is a plan (top) view of a lattice structure in accordance with the present disclosure created to provide the 3D spiral flow pattern shown in FIG. 5.

FIGS. 5 and 6 show yet another 3D lattice structure 200 in accordance with another embodiment of the present disclosure. In this example the lattice structure 200 is engineered to provide a spiral, pyramid flow path 202 as indicated in the simplified diagrammatic drawing of FIG. 5. FIG. 6 shows a plan view (top view looking down) onto the lattice structure 200 to further illustrate the spiral, pyramid flow path 202.

Figure 7A:
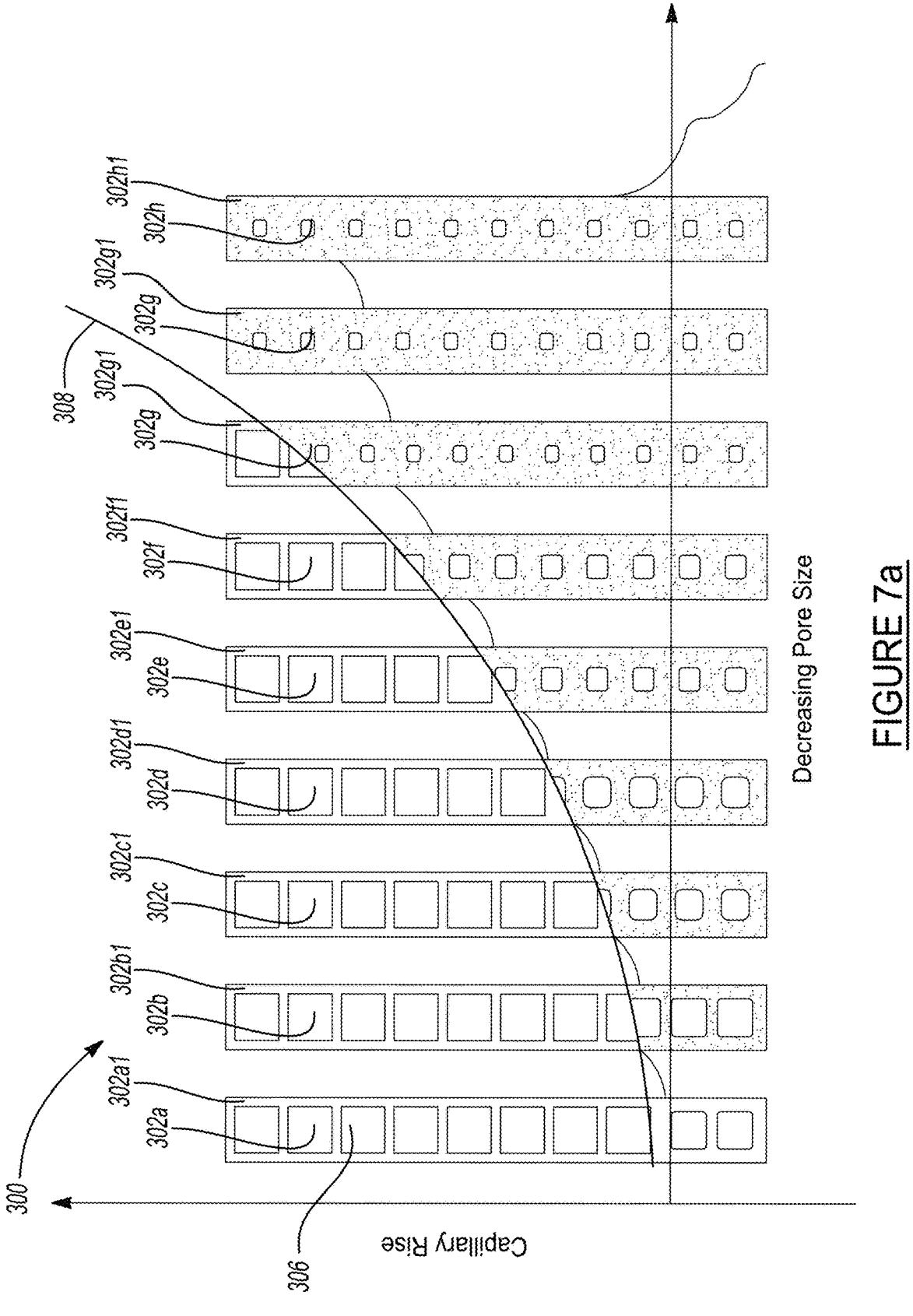
FIG. 7a is a side view of a portion of a lattice structure in accordance with the present disclosure, illustrating how the size of the voids (i.e., pores) in each cell of the structure strongly influences the capillary flow characteristics within the structure.
Figure 7B:
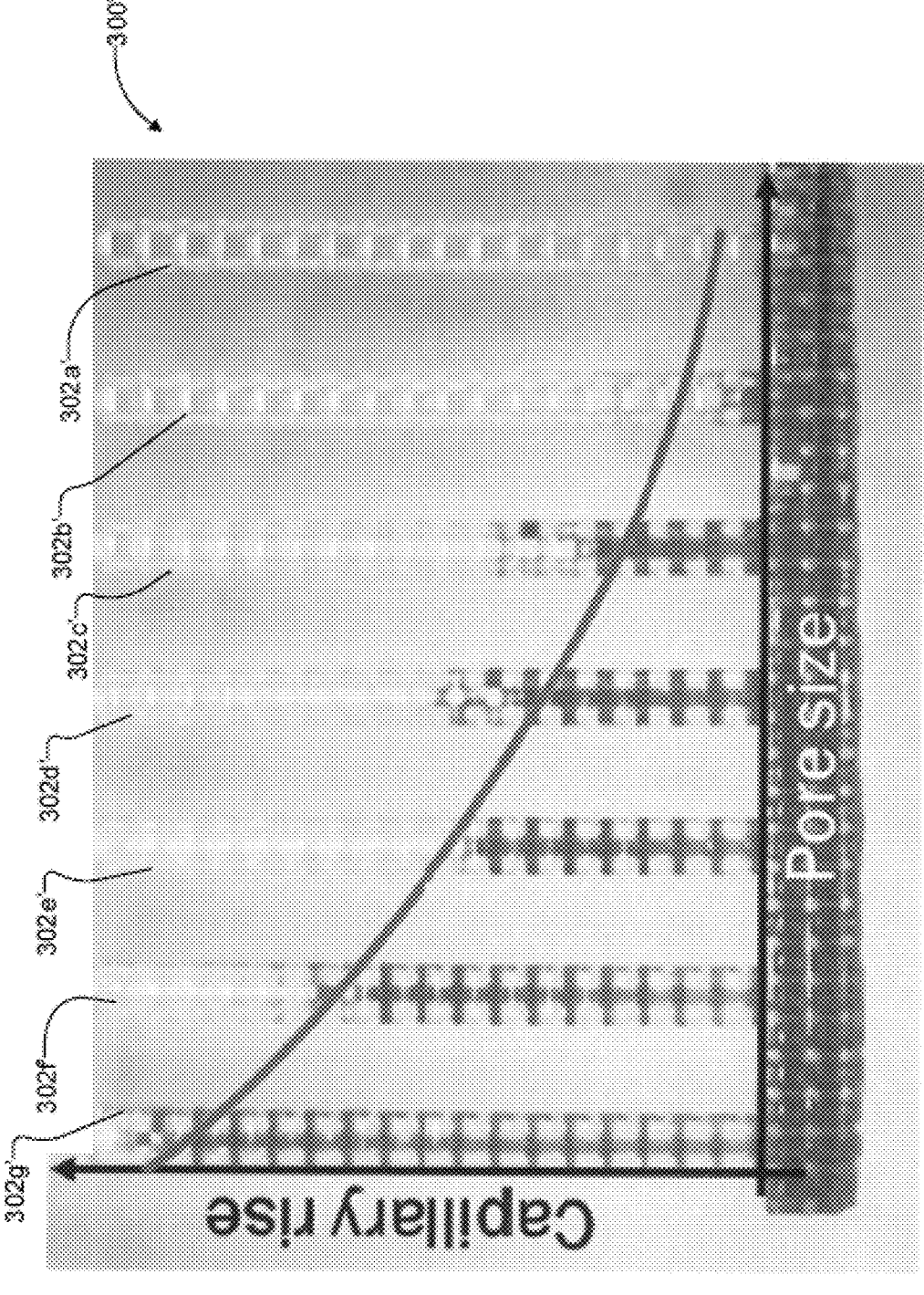
FIG. 7b shows a side view of a portion of a lattice structure similar to that shown in FIG. 7a, but with the columns further spaced apart from one another, which limits bleed-through of fluid to adjacent columns.

FIG. 7a shows a portion of a lattice structure 300 constructed in accordance with one embodiment of the present disclosure to illustrate how the manufacture of the lattice structure 300 controls the capillary flow through cells of the structure. The lattice structure 300 is designed by tessellating one or more types of 3D unit cells in space. In this example the lattice structure 300 includes pluralities of unit cells 302a-302h formed by interconnecting struts 306, which form voids 302a1-302h1 in each unit cell. Unit cells 302a are disposed adjacent one another to form one column, while unit cells 302b-302h are also disposed in a like manner to form a plurality of closely adjacently positioned columns. In this example the unit cells 302a each have centrally formed voids 302a1, while unit cells 302b-302h each have voids 302b1-302h1 respectively. The voids 302a1 can be seen to be the largest in cross sectional area. The voids 302b1 are smaller in cross sectional area than the voids 302a1, voids 302c1 are smaller than the voids 302b1, and so forth, with the voids 302h1 being the smallest. Note also that the spacing between adjacent columns of cells decreases from left to right across the lattice structure 300, such that the columns formed by the cells 302a and 302b are spaced farther apart than columns formed by the unit cells 302g and 302h. FIG. 7b shows a similar lattice structure 300' but with the columns 302a'-302g' spaced even further apart, which prevents "bleed through" of liquid between adjacent columns. Accordingly, the spacing of the columns of the structures 300 and 300' can also be used to help control the capillary flow of fluid through the lattice structures.

The porosity of the lattice structure 10 can further be controlled by changing one or more parameters, for example, changing the unit cell size of each unit cell 302a-302h shown in FIG. 7a in one or more of the X, Y and/or Z dimensions, or changing the material used to construct the one or more of the unit cells 302a-302h. Porosity can also be changed by changing dimensions of the struts 306 that are used to form the cells 302a-302g so as to change the dimensions of the voids 302a1-302h1. In this example it will be noted that the struts 306 used to form the column of cells 302a are considerably thinner than those used to form column of cells 302h. The voids 302a1-302h1 (i.e., the empty space) in each unit cell 302a-302h influences the capillary flow of the liquid front, and can remain constant or change shape throughout the lattice structure 300. Curve 308 indicates how the porosity of the lattice structure 300 increases as the pore size (dimensions of the voids 302a1-302h1) creases.

The lattice structure 300 may also contain one or more additional features such as solid walls and surfaces, or selectively located inlets and outlets for fluid flow to enable connecting to microfluidic pumps and other components or devices. The final design of the lattice structure 300, or any of the other embodiments discussed herein, may be generated as a CAD (computer aided design) file.

When the physical lattice 10, 100, 200 or 300 is fabricated from the CAD file, such fabrication may be accomplished, in one example, by additive manufacturing methods such as projection microstereolithography (PµSL) or two photon lithography (2PL), in which a light source is used to selectively polymerize a pattern onto a surface of a photosensitive resin. The process is repeated layer-by-layer for each digital slice of the CAD file (microns to tens of microns in thickness). The photosensitive resin may contain (but is not limited to) one of more of the following components: (1) one or more monomer or polymer species, typically those undergoing light-initiated free radical polymerization (e.g., acrylates, thiolenes), (2) a photoinitiator, (3) a photoabsorber, (4) stabilizers or inhibitors (e.g., 4-methoxyphenol), (5) salts or solid fillers (e.g., catalyst material, sacrificial material, pore formers, nanoparticles for improved mechanical properties), (6) solvents or diluents, (7) other additives (e.g., surfactants, thermal initiators, sintering aids, adhesion promoters, etc.). The fabrication process may also include multiple resins (e.g., a hydrophilic and a hydrophobic polymer) that are selectively cured, as well as a rinsing step between swapping resins, for example by delivering water or solvents to the printed body, or dipping the printed body into a bath.

The fabricated lattice 10/100/200/300 may be cleaned using chemical or physical methods, for example through the use of solvents or through sonication, and may be post-cured. Post-curing may be carried out, for example, by using a UV chamber or similar light source, or by thermal treatment, and further functionalized (e.g., UV/ozone and oxygen plasma treatment).

Figure 8:
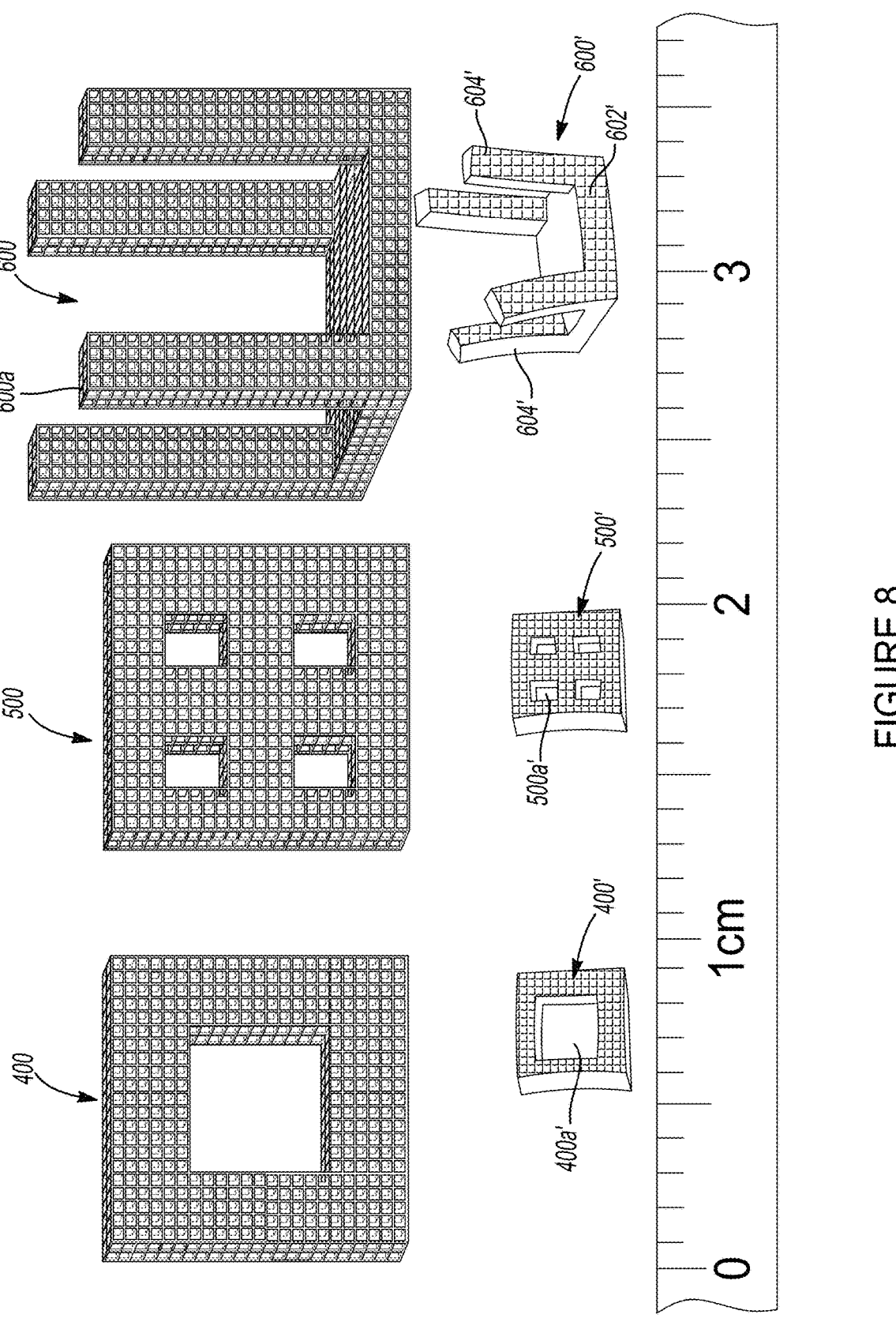
FIG. 8 shows various embodiments of different forms of lattice structures in accordance with the present disclosure, along with structures that have been carbonized to produce electrically conductive lattices.

Referring to FIGS. 8, examples of lattice structures 400, 500 and 600 which have been carbonized to form carbonized lattice structures 400', 500' and 600', respectively. In practice, one will be able to carbonize virtually any structure in order to make it electrically conductive. However, there is a fair amount of shrinkage during the carbonization process, as evident from the illustrations shown in FIG. 8, so this is an important factor that needs to be taken into account when designing the structure and the sizes of the cells/pores. The carbonized lattice structures 400'-600' are carbonized by thermally treating an underlying lattice structure to reduce the structure to a carbon-based structure which then has conductivity as one of its functionalities. The carbonized lattice structure 400' can be seen to include a substantially larger central void 400a', while carbonized lattice structure 500' includes a plurality of smaller voids 500a'. Carbonized lattice structure 600' differs still further by including a base portion 602' with a plurality of spaced apart columns 604' that project outwardly from the base portion. A principal feature of the structures shown in FIG. 8 is that due to capillary forces, the liquid will be contained in the tiny pores of the lattices and not bleed out into the larger voids 400a' of 400', 500a' of 500' and the spaces between columns 604'.

One or more catalyst materials or functional coatings may also be applied to any of the lattice structures 10, 100, 200, 400-600 or 400'-600' by methods including, but not limited, to: (1) electroplating, for example using copper, gold or silver, (2) electroless plating, for example using nickel phosphide, copper, or gold, (3) atomic layer deposition, (4) chemical vapor deposition, and (5) liquid flow and evaporation, such as by flowing a solution containing a solvent through the lattice structure 100-400, followed by evaporation of the solvent.

Catalyst-coated lattice structures may also be deployed as active electrodes in electrochemical reactors or fuel cells. This use can include incorporation into standard H-cell reactor configurations, liquid-fed, vapor-fed, and liquid/vapor-fed flow cells, or as gas diffusion electrodes (GDEs). A typical use case is the electrochemical reduction of carbon dioxide ($CO_2$) into useful products. One example of a possible GDE setup using a lattice fluidic device may involve: (1) a cathode consisting of a lattice coated with a metallic catalyst (e.g., copper), (2) a liquid electrolyte (e.g., a hydroxide or salt solution) contained or flowing through the smaller capillary pores of the lattice, (3) the reactant gas ($CO_2$) flowing through larger pores in the lattice, (4) a counter electrode (e.g., a similar lattice of a "mirrored" structure), (5) an anion exchange membrane, and (6) other electrochemical cell elements (e.g., reference electrode, O-rings/gaskets, tubing, electrode connections to external instrumentation, etc.). The use of lattice structures 400-600 constructed with solid-liquid-gas interfaces (catalyst-electrolyte-$CO_2$) are expected to have especially significant commercial interest and activity.

The use of the engineered lattice structures 10/100/200/300/400'/500'/600' thus provides the ability to optimize the lattice structure by maximizing the occurrence of these triple-phase interfaces. Lattice structures 100-600 further enable shifting the overall reactor design space from a planar to a three-dimensional configuration, thereby even further increasing productivity per unit volume.

Other example implementations/applications for the lattice structures 10-600 disclosed herein include (but are not limited to): 1) A lattice fluidic device for evaporative mass transport, in which the occurrence of liquid-gas interfaces is optimized for transport of species from the liquid to the gas phase; 2) a lattice fluidic device for $CO_2$ or other gas capture, in which the occurrence of liquid-gas interfaces is optimized for efficient dissolution of the gas molecules into the liquid phase; 3) a lattice fluidic liquid-liquid extraction device, in which two liquids are brought into contact without mixing, and the species of interest is transported by chemical potential driven diffusion from one phase to the other, at maximum occurrences of liquid-liquid interfaces; 4) a lattice fluidic heat exchanger, in which two immiscible fluids of different temperatures are brought into contact within the lattice to facilitate heat transfer; 5) a lattice fluidic thermal element, in which the lattice is made of a thermally conductive material and provides heating or cooling of the fluid selectively and efficiently; or 6) as printheads for ink delivery.

The systems and methods disclosed herein are expected to find utility in a wide range of devices. Such devices may include devices in which chemical reactions, heat and mass transport at interfaces are important, such as electrochemical devices, thermochemical devices, bio-reactor devices, batteries, fuel cells, etc. Specific applications may include, but are not limited to, electrochemical reaction catalysis at gas-liquid-solid interfaces, liquid-liquid interface extraction, microfluidic heat transfer, sensing platforms, controlled evaporation devices, and selective coating technologies.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A computer aided design (CAD) manufactured lattice structure for taking in and routing a fluid using a capillary action, the lattice structure comprising:

a plurality of tessellated cells formed from a plurality of interconnected struts, the interconnected struts having first length sections associated with different ones of a plurality of parallel, elongated columns, and second length sections, with the first length sections being longer than the second length sections, and the Interconnected struts being formed from a curable resin; and at least a subplurality of the interconnected struts being such that the first length sections extend a full length of their associated said column, and are oriented parallel to one another to form the plurality of parallel, elongated columns of the tessellated cells, and such that the second length sections are arranged perpendicular to the first length sections and spaced apart along a length of each one of said first length section to form a plurality of voids having a common dimension within each one of the plurality of parallel, elongated columns, and wherein a dimension of the volds in adjacent ones of the parallel, elongated columns differ from one said parallel, elongated column to another due to different cross-sectional dimensions of the first length sections;

the voids within each said cell configured to receive the fluid, the voids communicating with one another, and at least a subplurality of adjacent ones of the first length sections being non-uniform in the cross-sectional dimension, relative to one or more of the adjacent ones of the first length sections, to create the voids as three-dimensional voids which vary in volume in a predetermined manner, such that the three-dimensional voids created by a combination of the first length sections being non-uniform in the cross-sectional dimension and spacings of the first length sections creates a varying porosity within the lattice structure, with the varying porosity designed to one of increase or decrease from a first portion to a second portion of the lattice structure, to control how the fluid is taken in by the capillary action and how the fluid is channeled by the capillary action into and through selected ones of the three-dimensional voids, such that the fluid propagates through the plurality of tessellated cells along at least one predetermined flow path through the three-dimensional voids;

wherein the varying porosity is such as to create a non-uniform capillary flow action across or through the three-dimensional voids of the lattice structure, from the first portion to the second portion of the lattice structure, to achieve the flow along the at least one predetermined flow path; and wherein the lattice structure has a porosity that creates a plurality of separate capillary flow paths in at least one plane for the fluid entering a designated point of the lattice structure.

2. The lattice structure of claim 1, wherein the separate capillary flow paths are formed generally parallel to one another such that the fluid entering the designated point is split into the plurality of separate capillary flow paths after entering the lattice structure.

3. The lattice structure of claim 2, wherein the separate capillary flow paths form linear flow paths.

4. The lattice structure of claim 2, wherein the separate capillary flow paths are created in first and second non-parallel planes within the lattice structure.

5. The lattice structure of claim 1, wherein the at least one predetermined flow path forms a spiral flow path extending within an internal three dimensional volume of the lattice structure.

6. The lattice structure of claim 1, wherein the varying porosity is such as to create an increasing capillary flow action across a dimension of the lattice structure.

7. The lattice structure of claim 1, wherein at least a portion of the lattice structure is carbonized.

8. The lattice structure of claim 1, wherein the lattice structure forms a plurality of liquid-gas interfaces.

9. The lattice structure of claim 1, wherein the lattice structure is constructed using a catalyst to form a plurality of solid-liquid-gas interfaces.

10. The lattice structure of claim 1, wherein the lattice structure comprises a lattice fluidic device for evaporative mass transport, which is formed to create at least one of:

a first plurality of occurrences of liquid-gas interfaces throughout at least a portion of the lattice structure, the occurrences of liquid-gas interfaces being optimized for transport of species from a liquid phase to a gas phase;

a second plurality of occurrences of liquid-gas interfaces occurring throughout at least a portion of the lattice structure which are optimized for efficient dissolution of gas molecules into the liquid phase; or a lattice fluidic liquid-liquid extraction device, in which two liquids are brought into contact without mixing within the lattice structure, and a species of interest is transported by chemical potential driven diffusion from one phase to the other, at maximum occurrences of liquid-liquid interfaces within the lattice structure.

11. The lattice structure of claim 1, wherein the lattice structure comprises a lattice fluidic heat exchanger, which enables two immiscible fluids of different temperatures to be brought into contact within the lattice structure to facilitate heat transfer.

12. The lattice structure of claim 1, wherein the lattice structure forms a lattice fluidic thermal element, in which the lattice is made of a thermally conductive material and provides at least one of selective heating or cooling of the fluid.

13. A computer aided design (CAD) manufactured lattice structure for taking in and routing a fluid using a capillary action, the lattice structure comprising:

a plurality of tessellated cells formed from a plurality of interconnected struts, the interconnected struts having first length sections associated with different ones of a plurality of parallel, elongated columns, and second length sections, with the first length sections being longer than the second length sections, and the interconnected struts being formed from a curable resin; and at least a subplurality of the interconnected struts being such that the first length sections extend a full length of their associated said column, and are oriented parallel to one another to form the plurality of parallel, elongated columns of the tessellated cells, and such that the second length sections are arranged perpendicular to the first length sections and spaced apart along a length of each one of said first length section to form a plurality of voids having a common dimension within each one of the plurality of parallel, elongated columns, and wherein a dimension of the voids in adjacent ones of the parallel, elongated columns differ from one said parallel, elongated column to another due to different cross-sectional dimensions of the first length sections;

the voids within each said cell configured to receive the fluid, the voids communicating with one another, and at least a subplurality of adjacent ones of the first length sections being non-uniform in the cross-sectional dimension, relative to one or more of the adjacent ones of the first length sections, to create the voids as three-dimensional voids which vary in volume in a predetermined manner, such that the three-dimensional voids created by a combination of the first length sections being non-uniform in the cross-sectional dimension and spacings of the first length sections creates a varying porosity within the lattice structure, with the varying porosity designed to one of increase or decrease from a first portion to a second portion of the lattice structure, to control how the fluid is taken in by the capillary action and how the fluid is channeled by the capillary action into and through selected ones of the three-dimensional voids, such that the fluid propagates through the plurality of tessellated cells along at least one predetermined flow path through the three-dimensional voids;

the varying porosity is such as to create a non-uniform capillary flow action across or through the three-dimensional voids of the lattice structure, from the first portion to the second portion of the lattice structure, to achieve the flow along the at least one predetermined flow path; and the at least one predetermined flow path forms a spiral flow path extending within an internal three dimensional volume of the lattice structure.

* * * * *